US006725633B2

United States Patent
Resterhouse

(10) Patent No.: US 6,725,633 B2
(45) Date of Patent: Apr. 27, 2004

(54) SEPARATOR ASSEMBLY FOR FILLER DEVICE AND ASSOCIATED METHOD

(75) Inventor: Michael R. Resterhouse, Muskegon, MI (US)

(73) Assignees: Fogg Filler Company, Holland, MI (US); Scholle Corporation, Irvine, CA (US)

( * ) Notice: Subject to any disclaimer, the term of this patent is extended or adjusted under 35 U.S.C. 154(b) by 0 days.

(21) Appl. No.: 10/268,551

(22) Filed: Oct. 10, 2002

(65) Prior Publication Data

US 2003/0033704 A1 Feb. 20, 2003

Related U.S. Application Data

(63) Continuation-in-part of application No. PCT/US01/13472, filed on Apr. 26, 2001, which is a continuation-in-part of application No. 09/584,467, filed on May 31, 2000, now abandoned.

(51) Int. Cl.[7] ............................................... B65B 51/26
(52) U.S. Cl. ............................................ 53/547; 53/570
(58) Field of Search .................... 53/547, 570; 83/613, 83/614, 636, 694; 29/426.1

(56) References Cited

U.S. PATENT DOCUMENTS 3,939,628 A * 2/1976 Schjeldahl
4,219,054 A 8/1980 Carter et al.
4,510,737 A * 4/1985 Ellert
4,620,411 A 11/1986 Schieser et al.
4,924,658 A 5/1990 Takehama
4,962,797 A 10/1990 Thomsen
5,105,703 A 4/1992 Kondô
5,259,306 A 11/1993 Jenkins et al.
5,450,882 A 9/1995 Cragun
5,690,151 A 11/1997 Rutter et al.

FOREIGN PATENT DOCUMENTS

WO    WO 01/92110 A1 * 6/2001

* cited by examiner

*Primary Examiner*—Douglas Olms
*Assistant Examiner*—Steve Blount
(74) *Attorney, Agent, or Firm*—King & Jovanovic, PLC

(57) ABSTRACT

A separator assembly for separating a container from a web of at least two containers, comprising a frame member, a clamp and a clamp actuator. The frame includes a base. The clamp is associated with the frame member. The clamp includes a lower surface defined by at least two legs and a slot positioned therebetween to, in turn, facilitate the clamping of a portion of a web of at least two containers relative to the base. The clamp actuator is associated with each of the at least one clamp and the frame. The at least one clamp actuator is capable of selectively moving the at least two legs and the slot of the lower surface of the at least one clamp relative to the frame, to, in turn, releasably clamp a portion of a web of at least two containers between the base and the at least two legs.

21 Claims, 5 Drawing Sheets

FIG. I

SEPARATOR ASSEMBLY FOR FILLER DEVICE AND ASSOCIATED METHOD

CROSS-REFERENCE TO RELATED APPLICATION

This application is a continuation-in-part application of co-pending PCT Patent Application Ser. No. PCT/US01/13472 filed Apr. 26, 2001, entitled "Separator Assembly for Filler Device and Associated Method", which claims cont. priority of U.S. patent application Ser. No. 09/584,467 filed May 31, 2000, entitled "Separator Assembly for Filler Device and Associated Method.", now abandoned.

BACKGROUND OF THE INVENTION

1. Field of the Invention

The present invention relates in general to a separator assembly, and more particularly, to a separator assembly, for use in association with a filler device, which is configured to separate associated containers prior to filling of the same.

2. Background Art

Separator assemblies for use in association with filler devices have been known in the art for years. To the best of Applicant's knowledge, many separator assemblies are configured to separate two or more containers after the containers have been at least partially filled, whereby the mass of the matter within the containers substantially assists in the separation process. While these separator assemblies are commercially acceptable for use in non-rotary filler devices, their use in rotary filler devices remains problematic inasmuch as many containers are provided in a web form, which can not be properly articulated through such a rotary filler device. In addition, separator assemblies are also configured to separate two or more containers after the containers have been at least partially filled. However, such assemblies comprise a notched blade for accommodating the rim of the containers, which hinders and/or precludes proper separation of associated containers near the notched region of the blade.

It is therefore an object of the present invention to provide a reliable separator assembly for use in association with rotary filler devices, which remedies the detriments and/or complications associated with conventional separator assemblies configured for use with non-rotary filler devices.

These and other objects of the present invention will become apparent in light of the present specification, claims, and drawings.

SUMMARY OF THE INVENTION

The invention comprises a separator assembly for separating a container from a web of at least two containers. The separator assembly comprises a frame, at least one clamp and at least one clamp actuator. The frame member includes a base. The at least one clamp includes a lower surface defined by at least two legs and a slot positioned therebetween to, in turn, facilitate the clamping of a portion of a web of at least two containers relative to the base. The at least one clamp actuator is associated with each of the at least one clamp and the frame. The at least one clamp actuator is capable of selectively moving the at least two legs and the slot of the lower surface of the at least one clamp relative to the frame, to, in turn, releasably clamp a portion of a web of at least two containers between the base and the at least two legs.

In a preferred embodiment, the at least one clamp is pivotally mounted to each of the frame member and the at least one clamp actuator, to, in turn, pivot relative to each of the frame member and the at least one actuator from a released orientation to an engaged orientation. In one such embodiment, the separator assembly includes a handle and a first mounting structure. The first mounting structure is pivotally mounted to the handle by way of a first linkage. In another such embodiment, the separator assembly includes a second mounting structure. The second mounting structure is pivotally mounted to the handle by way of a second linkage.

In yet another such embodiment, the handle includes a first end and a second end. The first end is attached to the at least one clamp; the second end is attached to each of the first and second linkages. The at least one actuator is mounted to the handle member between the first and second end thereof.

In another embodiment, the at least one clamp comprises a pair of clamps, wherein the clamps are positionable so as to place the slots of the lower surfaces in a substantially collinear orientation.

In yet another embodiment, the separator further comprises a blade assembly and a blade actuator. The blade assembly is associated with the base. The blade actuator is associated with the blade assembly. The blade actuator is capable of selectively moving the blade assembly relative to the base, to, in turn, facilitate the entry of the blade into the slot of the lower surface of the at least one clamp.

In one embodiment, the blade assembly includes a blade which is structurally configured to facilitate the separation of a container from a web of at least two containers, upon insertion of at least a portion of same within the slot of the lower surface of the at least one clamp.

In another embodiment, the blade further comprises a plurality of sub-regions. Each sub-region includes at least one pair of inclines culminating in a peak. In certain such embodiments, the inclines of adjoining sub-regions meet at a valley.

In yet another embodiment, one of the plurality of peaks extends beyond another of the plurality of peaks.

In another embodiment, the plurality of sub-regions comprises two side sub-regions and a central sub-region. The inclines of the sub-regions meet to define two valleys. The peak of the central sub-region extends beyond the peaks of each of the two side sub-regions.

The invention further comprises a separator assembly for separating a container from a web of at least two containers. The separator assembly comprises a frame member, a handle member, at least one clamp and at least one clamp actuator. The frame member includes a base. The handle member includes a second end capable of pivotable and translative movement relative to the frame. The at least one clamp is associated with a first end of the handle member. The at least one clamp actuator is pivotally associated at a first end with the frame member and pivotally associated at a second end with the handle member between the first and second ends thereof. The at least one clamp actuator is capable of selectively moving the at least one clamp relative to the base, to, in turn, releasably clamp a portion of a web of at least two containers therebetween.

In one embodiment, the frame member includes at least one post. In such an embodiment the invention further comprises a first mounting structure and a first linkage. The first mounting structure is positionable along the post. The first linkage is pivotally associated with each of the first mounting structure and the second end of the handle member, to, in turn, facilitate the pivotable and translative positioning of the at least one handle member relative to the frame member.

In a preferred embodiment, the separator assembly further comprises a second mounting structure positionable along the post and a second linkage pivotally associated with each of the second mounting structure and the second end of the handle member, to, in turn, facilitate the pivotable and translative positioning of the at least one handle member relative to the frame member.

In another preferred embodiment, the lower surface of the at least one clamp is defined by at least two legs and a slot positioned therebetween.

In a preferred embodiment, the invention further comprises a blade assembly associated with the base of the frame member, the blade assembly includes a blade capable of at least partially separating a container from a web of at least two containers upon retention of same by cooperation between the at least one clamp and the base.

In another preferred embodiment, the blade further comprises a plurality of sub-regions, each sub-region includes at least one pair of inclines culminating in a peak.

In another preferred embodiment, the inclines of adjoining sub-regions meet at a valley.

In another embodiment, the plurality of sub-regions comprises two side sub-regions and a central sub-region. The inclines of the sub-regions meet to define two valleys. The peak of the central sub-region extend beyond the peaks of each of the two side sub-regions.

BRIEF DESCRIPTION OF THE DRAWINGS

The invention will now be described with reference to the drawings wherein.

DETAILED DESCRIPTION OF THE INVENTION

Figure 1:
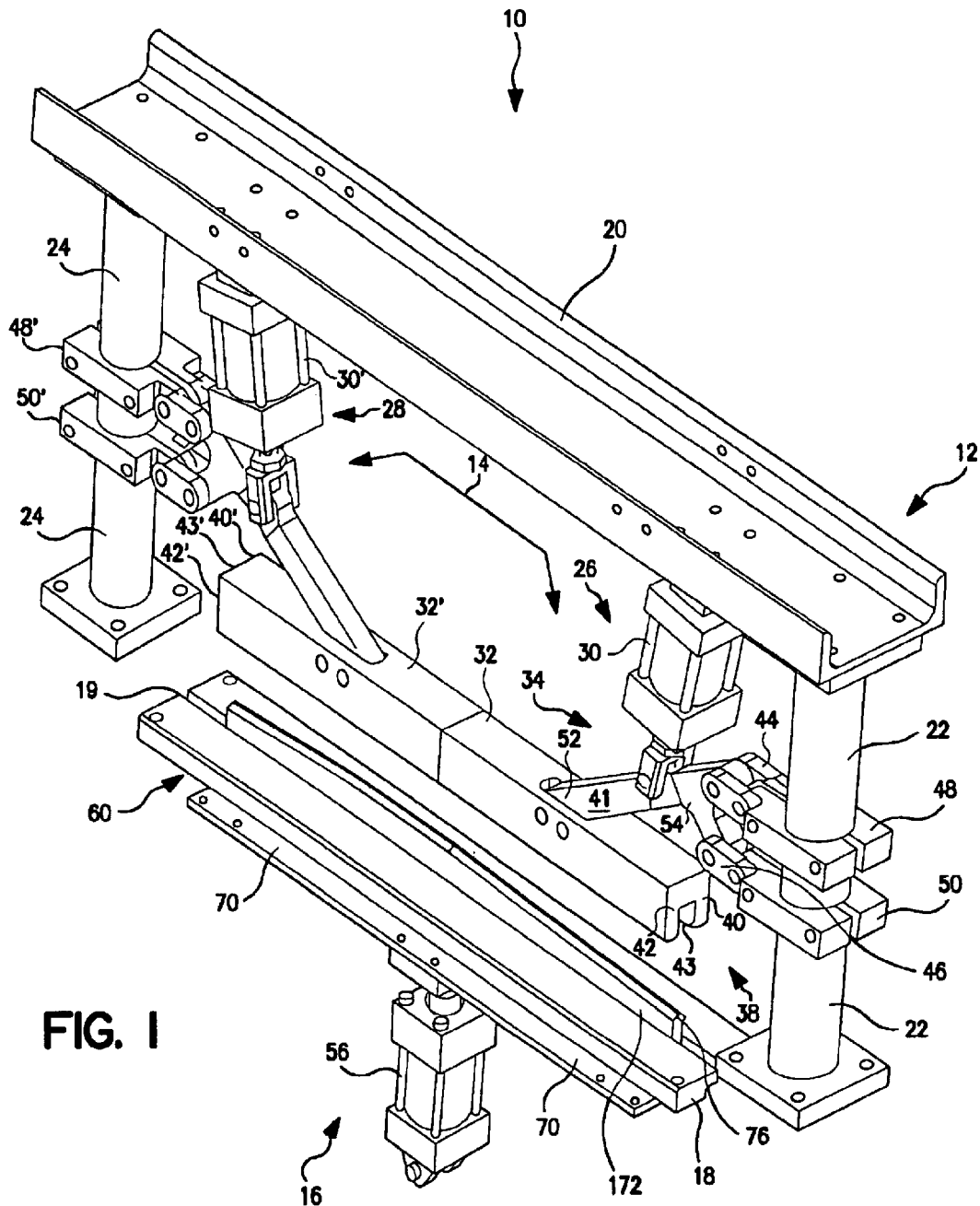
FIG. 1 of the drawings is a perspective schematic representation of a separator assembly in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, are identified throughout the drawings by like reference characters.

Referring now to the drawings and to FIG. 1 in particular, a perspective schematic representation of a first embodiment of separator assembly 10 is shown, which generally comprises frame 12, means 14 for clamping a container to frame 12, means 16 for separating the containers relative to each other. Specifically, as will be explained, separator assembly 10 is generally utilized to separate containers, such as bags and the like, which are attached to each other to form a web. For certain applications, it is advantageous to separate the containers prior to the filling of the containers. One such application is when the containers are associated with a rotary filler device.

It will be understood that the Figures are merely schematic representations. As such, some of the components have been distorted from their actual scale for pictorial clarity.

Figure 3:
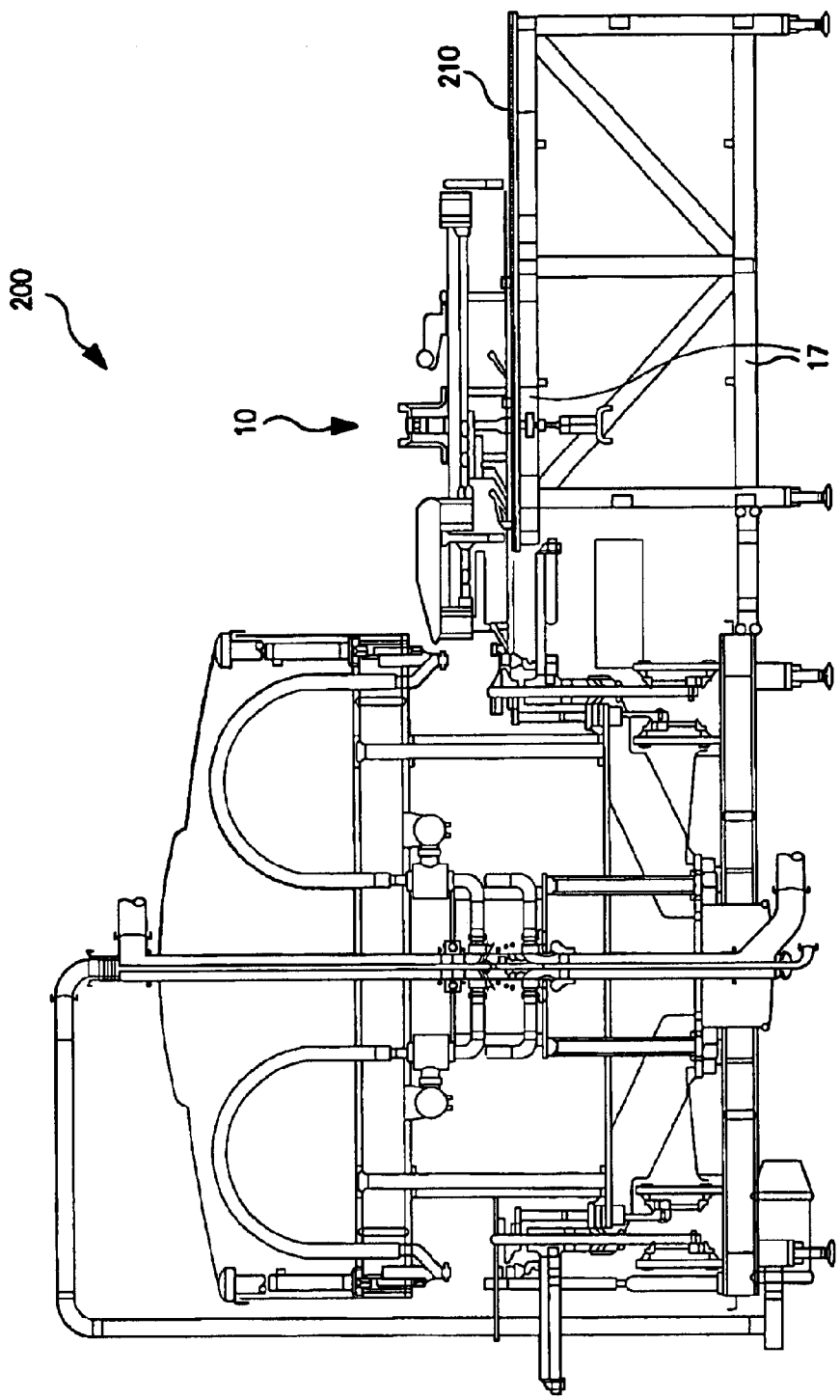
FIG. 3 of the drawings is a cross-sectional schematic representation of a separator assembly associated with a filler device.

As is shown in FIG. 3, separator assembly 10 is primarily intended for use in association with filler device 200, which is capable of filling associated containers and/or bags with any one of a number of materials in solid, liquid, and/or gaseous states. It will be understood that while separator assembly 10 has been shown, for illustrative purposes only, as being associated with a rotary filler device, numerous other device configurations that would be known to those having ordinary skill in the art with the present disclosure before them are likewise contemplated for use.

Frame 12 is shown in FIG. 1 as comprising base 18, upper support 20 and posts 22 and 24. As will be understood, frame 12 is positioned on support member 17 (FIG. 3) which may rest on the ground (i.e. factory floor). Base 18 includes slot 19 extending therethrough for accepting blade 72 of separating means 16. Posts 22 and 24 extend substantially vertically away from the substantially horizontal base 18. Upper support 20 connects the upper ends of posts 22, 24 to each other. Frame 12 generally comprises a stainless steel material for durability purposes. However, the frame is not limited to any particular material, and, in fact, many materials are acceptable for use.

Posts 22 and 24 are substantially cylindrical in shape and are of sufficient length so as to permit the mounting of the clamping means 14 and enable the operation thereof. As will be explained below, the cylindrical shape facilitates adjustment of the operation of the clamping means. Additionally, posts 22 and 24 are spaced apart a distance which is greater that the width of the containers that may be passed through separator assembly 10.

Clamping means 14 is shown in FIG. 1 as comprising first assembly 26 and second assembly 28. Each assembly is substantially identical, and, therefore, the first assembly will be described with the understanding that the second assembly is substantially identical thereto. Specifically, first assembly 26 includes actuator 30, clamp 32 and means 34 for attaching the actuator to the clamp. Actuator 30 comprises an air cylinder which is pivotally attached to each of attachment means 34 and upper support 20. Of course, other actuators, such as hydraulic actuators or electric solenoids and the like are also contemplated for use.

Clamp 32 comprises a "C" channel 38 having legs 40, 42, and slot 43. The "C" channel is of a length which is approximately half of the width of the container or greater. As will be explained, legs 40, 42 cooperate with base 18 to clamp two containers against the base, wherein a perforated separation seam becomes positioned within the slot. Clamp 32 may comprise various materials, such as natural and synthetic composites, metals including stainless steel and the like. However, the clamp is not limited to any particular material. In addition, other cross-sectional configurations are contemplated (i.e. other than a "C" channel), wherein a resulting slot is disposed about the lower surface thereof.

Attachment means 34 includes handle 41, first linkage 44, second linkage 46 and mounting structures 48, 50. Handle 41 includes first end 52 and second end 54. First end 52 is attached to clamp 32. Actuator 30 is attached to handle 41 between first end 52 and second end 54. First linkage 44 attaches second end 54 to mounting structure 48. Second linkage 46 attaches second end 54 to mounting structure 50. Mounting structures 48 and 50 are slidably positionable and attachable to post 22 of frame 12. Adjustments to the movement of clamp 32 can be made by slidably moving mounting structures 48 and 50 along post 22.

Figure 2:
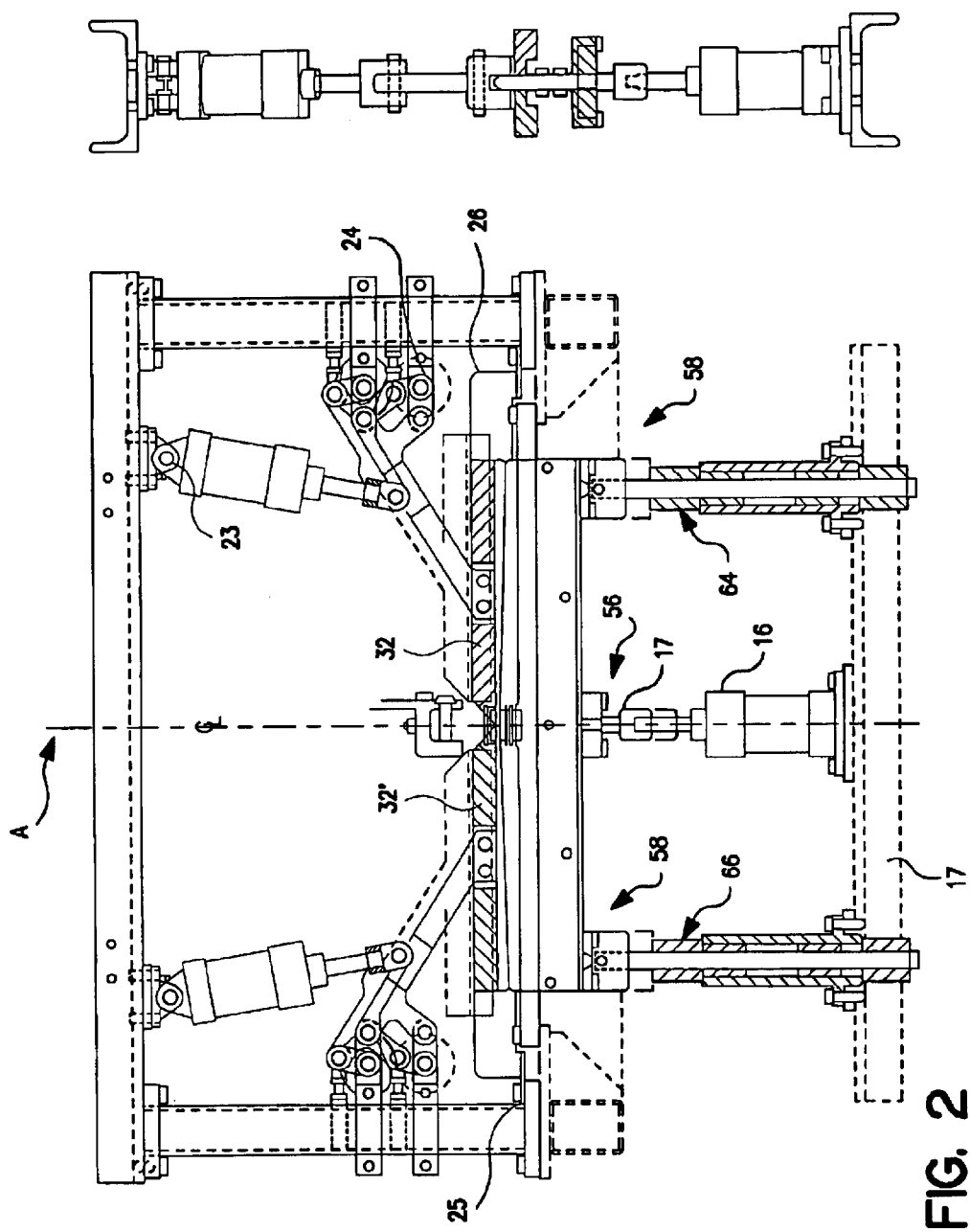
FIG. 2 of the drawings is a cross-sectional schematic representation of a separator assembly in accordance with the present invention.

Separating means 16 is shown in FIG. 1 as comprising blade assembly 60, actuator 56 and means 58 for guiding the actuator (See FIG. 2). Blade assembly 60 includes blade holder 70 and blade 72. Blade 72 includes a peak 76 about the central region thereof. Blade 72 may comprise metals, as well as plastics, composites, and the like. Blade 72 is releasably fastened to blade holder 70 so that it may be removed for resharpening, or so that it may be replaced with a fresh blade.

Actuator 56 comprises an air cylinder which is capable of moving blade assembly 60 along the guiding means so that blade 72 can extend through slot 19 of base 18. Specifically, actuator 56 is attached to blade holder 70 at one end and to support member 17 at the other end (See FIG. 2). Various other actuators are contemplated for use, including various hydraulic and electric units.

As is shown in FIG. 2, guiding means 58 comprises two guide pins assemblies 64, 66 mounted on either side of blade 60 assembly. The guide pin assemblies are mounted on support member 17 and extend substantially vertically. The guide pin assemblies are slidably movable and are attached to blade holder 70. As will be explained in detail below, the guide means in sure that blade assembly 60 will be guided vertically upon actuation of actuator 56.

In operation, as shown in FIG. 3, a web of joined containers is advanced along surface 210 so that a perforation between any two containers becomes disposed about slot 19 of base 18 (See FIG. 1). At such time, clamping means 14 is actuated by actuating actuator 30 so as to move clamp 32 in contact with base 18. Specifically, actuation of actuator 30 will rotate and translate handle 41 about first and second linkages 44, 46 so that clamp 32 is directed toward base 18. As clamp 32 contacts base 18, legs 40, 42 straddle the perforation between the two containers positioned within slot 43. Similarly, actuator 30' is actuated and, in turn, legs 40', 42' straddle the perforation to position the perforation within slot 43'.

Once clamps 32 and 32' are fully actuated, as shown in FIG. 2, actuating means 56 of separating means 16 is activated. At such time, blade 72 begins to move upward under the direction of the actuating means and by the control of guiding means 58. At some point, peak 76 breaks the plane of base 18 and contacts the perforation of the containers. Inasmuch as the containers are clamped by legs 40 and 42, further movement of blade 72 pierces the perforation and, in turn, separates the containers.

Once the containers are separated, the actuating means 56 are de-energized and blade 72 retracts through slot 19 of base 18. Next, actuators 30, 30' are de-energized and clamps 32, 32' move away from base 18 and release two separated containers. Once separated and released, the released container is transmitted to a fill device, such as rotary filler device 200 (See FIG. 3). The web of containers is advanced, and the process is repeated to separate the next container. The process can be repeated until the entire web is separated.

It may from time to time become necessary to adjust the actuation of clamping means 14. To achieve same, mounting structures 48 and 50 (as well as 48' and 50') can be slidably moved along posts 22 and 24, respectively, and re-tightened as necessary. Likewise, it may become necessary to adjust the travel of guide means 58 to limit the travel of blade 72.

Figure 4:
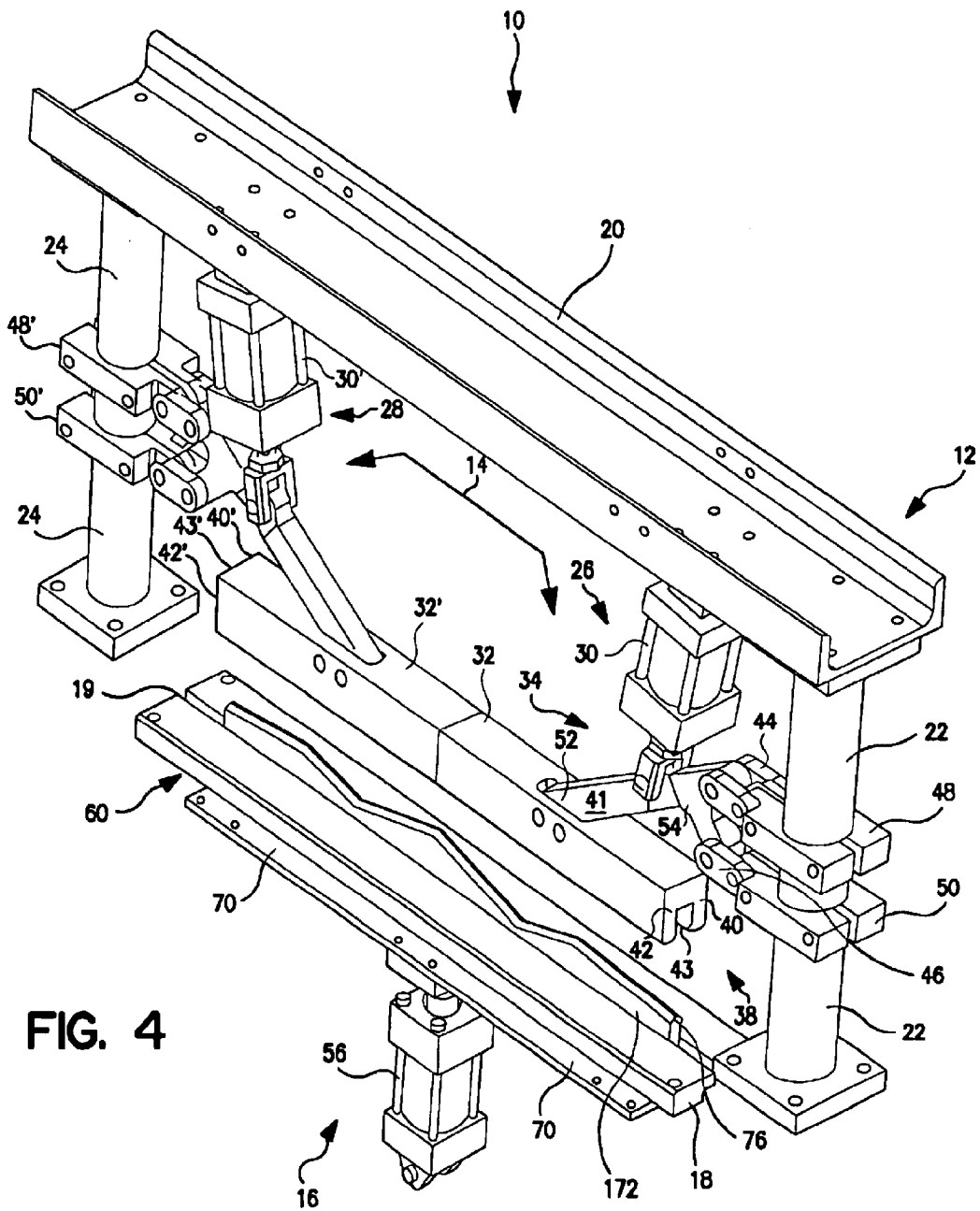
FIG. 4 of the drawings is a perspective schematic representation of a separator assembly in accordance with the present invention.

Referring now to FIG. 4, an alternative embodiment of the blade is shown generally at 172. Blade 172 is configured to facilitate the quick initiation of the separation of a container from of a web of containers, especially in regions wherein web retention and securement is minimized, while minimizing the vertical travel necessary by blade 172 to fully separate the container from the web of containers. Moreover, such a blade facilitates improved operation, especially in the instance wherein the clamps 32, 32' are adjusted such that a small gap may develop therebetween.

Figure 5:
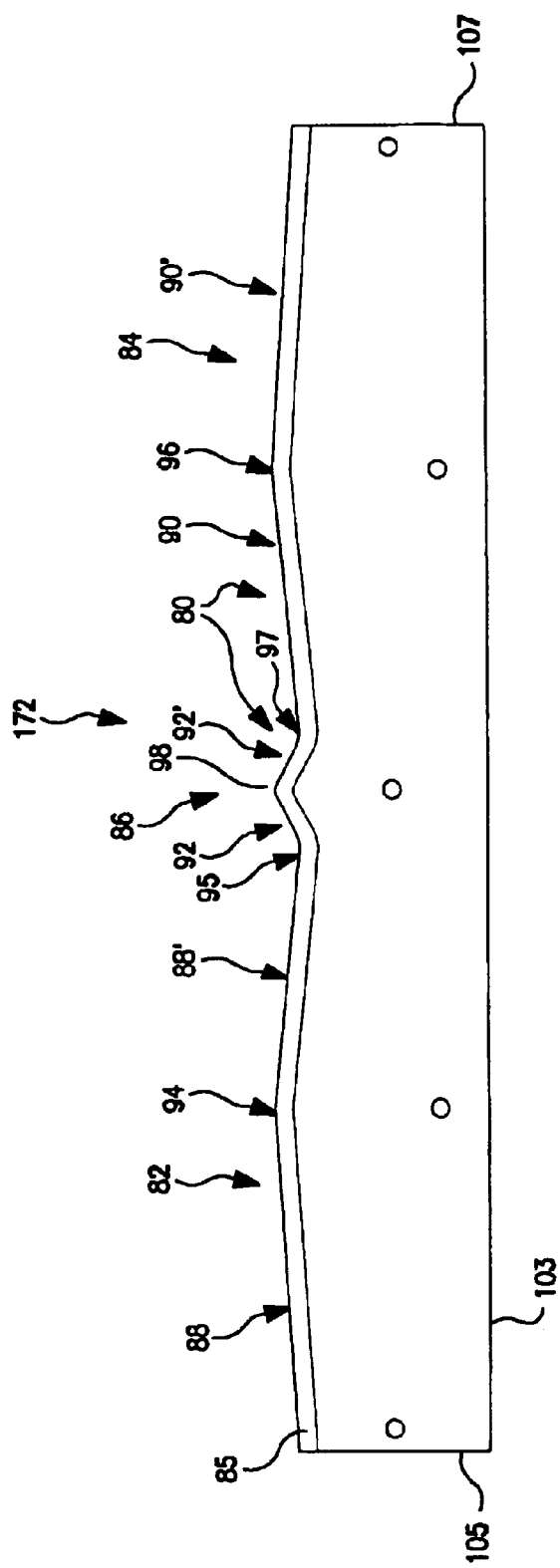
FIG. 5 of the drawings is a front plan view of a blade of the present invention.

Blade 172 is shown in more detail in FIG. 5 as including a bottom surface 103, side edges 105, 107 and plurality of cutting sub-regions, such as sub-regions 80. As will be explained, the different sub-regions may be configured differently, so as to achieve different piercing and separating characteristics. In the particular embodiment shown, blade 172 includes a three cutting sub-regions, namely, side sub-regions 82, 84 and central sub-region 86. Of course, it will be understood that in varying embodiments, the sub-regions may each be configured differently, and, each of the sub-regions may be symmetrically or asymmetrically disposed along blade 172. Additionally, while three cutting sub-regions are shown in the present embodiment, it will be understood that embodiments having a greater or fewer number of cutting sub-regions are contemplated.

Sub-region 82 includes inclines 88, 88' which are directed toward each other and which meet at peak 94 (i.e., substantially the highest point of the sub-region). Similarly, sub-region 84 includes inclines 90, 90' which are also directed toward each other and which meet at peak 96. Central sub-region 86 includes inclines 92, 92' which are directed toward each other and which meet at peak 98. As shown in FIG. 4, incline 88' and incline 92 meet at valley 95 and incline 90 and 92' meet at valley 97. In the embodiment shown, peak 98 extends above peaks 94, 96, such that, in use, peak 94 makes initial contact with the web of joined containers. It will be understood that the varying peaks may include surface configurations, such as serrations, or the like to further facilitate the cutting of the web of containers.

It will be understood that in various embodiments, a sub-region may include in excess of a single peak, and, in turn, may include a plurality of peaks which are connected by way of a pair of inclines or a substantially horizontal surface. In other embodiments, it will be understood that a sub-region may include only a single inclined surface and a peak (i.e., an incline which has its peak proximate the edge of blade).

Additionally, the absolute value of the slope of each of the inclines 92, 92' of the central sub-region are generally greater than the absolute value of the slope of the inclines 88, 88', 90, 90' of the side sub-regions 82, 84. Similarly, inclines 88, 88', 90, 90' are longer than inclines 92, 92'. Of course, the slopes and the relative lengths of the various inclines can be varied by one of skill in the art.

The inclines 88, 88', 90, 90', 92, 92' are positioned end to end, to form an integral and substantially continuous edge 83. The continuous edge may be sharpened to a fine edge to facilitate the separating of joined containers of the web. Of course, in certain embodiments, the separate sub-regions may comprise separate components which are attached together to form blade 172. As such, edge 83 may be discontinuous and may include separations in the blade.

Such an embodiment may be useful, for example, wherein certain portions of edge 83 wear at faster rates than other portions of edge 83.

Referring again to FIG. 4, blade 172 is shown as being positioned within separator assembly 10. In operation of such an embodiment, as the web of joined containers is advanced along surface 210 (FIG. 3), the perforations between any two containers becomes disposed about slot 19 of base 18. Once clamped, the blade moves upward under the direction of the actuating means and by the control of the guiding means. Due to the configuration of blade 172, peak 98 of central sub-region 86 first contacts the web. Due to the relatively steep angle of inclines 92, 92' thereof, peak 98 controllably, yet forcefully pierces the web, to facilitate the initial separation thereof. Inasmuch as legs 40 and 42 do not clamp the central region of the web, the steep angle facilitates the initiation of the separation of the web, without adversely and/or detrimentally pushing the web upwardly away from base 18.

Upon continued movement of the blade in an upward direction, peaks 94 and 96 of the side sub-regions 82, 84, respectively, contact and pierce the web. Finally, the inclines contact the web along the lengths thereof to fully separate the joined containers. The slope of the inclines surrounding peaks 94,96 may have a configuration which is not as steeply inclined as central peak 98.

It will be understood that as the absolute values of the inclines of the sub-regions increase, the vertical displacement of blade 172 required to achieve separation correspondingly increases. However, the greater the absolute value of the inclines of the sub-regions, the less force that is required to pierce the web, and the less displacement and/or stretching that is imparted upon the web prior to cutting. Advantageously, blade 172 facilitates the quick and controlled initial piercing of the web by way of central sub-region 86, while minimizing the vertical travel necessary by blade 172 to effectively separate the respective container of the web of attached containers.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A separator assembly for separating a container from a web of at least two containers, comprising:
    a frame member having a base;
    at least one clamp associated with the frame member, the at least one clamp including a lower surface defined by at least two legs and a slot positioned therebetween, wherein the two legs, and the slot are fixed to each other so as to be incapable of relative movement, to, in turn, facilitate the clamping of a portion of a web of at least two containers relative to the base; and
    at least one clamp actuator associated with each of the at least one clamp and the frame, the at least one clamp actuator capable of selectively moving the at least two legs and the slot of the lower surface of the at least one clamp relative to the frame, to, in turn, releasably clamp a portion of a web of at least two containers between the base and the at least two legs,
    wherein the at least one clamp is pivotally mounted to each of the frame member and the at least one clamp actuator, to, in turn, pivot relative to each of the frame member and the at least one actuator from a released orientation to an engaged orientation.

2. The separator assembly of claim 1, further comprising:
    a handle; and
    a first mounting structure, the first mounting structure pivotally mounted to the handle by way of a first linkage.

3. The separator assembly of claim 2, further comprising:
    a second mounting structure, the second mounting structure pivotally mounted to the handle by way of a second linkage.

4. The separator assembly of claim 3, wherein:
    the handle includes a first end and a second end, the first end being attached to the at least one clamp, the second end being attached to each of the first and second linkages, and wherein the at least one actuator is mounted to the handle member between the first and second end thereof.

5. The separator assembly of claim 1, wherein the at least one clamp comprises a pair of clamps, wherein the clamps are positionable so as to place the slots of the lower surfaces in a substantially collinear orientation.

6. The separator assembly of claim 1, further comprising:
    a blade assembly associated with the base; and
    a blade actuator associated with the blade assembly, the blade actuator capable of selectively moving the blade assembly relative to the base, to, in turn, facilitate the entry of the blade into the slot of the lower surface of the at least one clamp.

7. The separator assembly of claim 6, wherein the blade assembly includes a blade, the blade being structurally configured to facilitate the separation of a container from a web of at least two containers upon insertion of at least a portion of same within the slot of the lower surface of the at least one clamp.

8. The separator assembly of claim 7, wherein the blade further comprises:
    a plurality of sub-regions, each sub-region including at least one pair of inclines culminating in a peak.

9. The separator assembly of claim 8 wherein the inclines of adjoining sub-regions meet at a valley.

10. The separator assembly of claim 8 wherein one of the plurality of peaks extends beyond another of the plurality of peaks.

11. The separator assembly of claim 8 wherein:
    the plurality of sub-regions comprises two side sub-regions and a central sub-region;
    the inclines of the sub-regions meeting to define two valleys; and
    the peak of the central sub-region extending beyond the peaks of each of the two side sub-regions.

12. A separator assembly for separating a container from a web of at least two containers, comprising:
    a frame member having a base;
    a handle member having a second end capable of pivotable and translative movement relative to the frame;
    at least one clamp being associated with a first end of the handle member; and
    at least one clamp actuator pivotally associated at a first end with the frame member and pivotally associated at a second end with the handle member between the first and second ends thereof, the at least one clamp actuator capable of selectively moving the at least one clamp relative to the base, to, in turn, releasably clamp a portion of a web of at least two containers therebetween.

13. The separator assembly of claim 12, wherein the frame member includes at least one post, the invention further comprising:
   a first mounting structure positionable along the post; and
   a first linkage pivotally associated with each of the first mounting structure and the second end of the handle member, to, in turn, facilitate the pivotable and translative positioning of the at least one handle member relative to the frame member.

14. The separator assembly of claim 13 further comprising:
   a second mounting structure positionable along the post; and
   a second linkage pivotally associated with each of the second mounting structure and the second end of the handle member, to, in turn, facilitate the pivotable and translative positioning of the at least one handle member relative to the frame member.

15. The separator assembly of claim 13, wherein the lower surface of the at least one clamp is defined by at least two legs and a slot positioned therebetween.

16. The separator assembly of claim 12, further comprising:
   a blade assembly associated with the base of the frame member, the blade assembly having a blade capable of at least partially separating a container from a web of at least two containers upon retention of same by cooperation between the at least one clamp and the base.

17. The separator assembly of claim 16, wherein the blade further comprises:
   a plurality of sub-regions, each sub-region including at least one pair of inclines culminating in a peak.

18. The separator assembly of claim 17 wherein the inclines of adjoining sub-regions meet at a valley.

19. The separator assembly of claim 17 wherein:
   the plurality of sub-regions comprises two side sub-regions and a central sub-region;
   the inclines of the sub-regions meeting to define two valleys; and
   the peak of the central sub-region extending beyond the peaks of each of the two side sub-regions.

20. A separator assembly for separating a container from a web of at least two containers, comprising:
   a frame member having a base;
   at least one clamp associated with the frame member, the at least one clamp including a lower surface defined by at least two legs and a slot positioned therebetween to, in turn, facilitate the clamping of a portion of a web of at least two containers relative to the base;
   at least one clamp actuator associated with each of the at least one clamp and the frame, the at least one clamp actuator capable of selectively moving the at least two legs and the slot of the lower surface of the at least one clamp relative to the frame, to, in turn, releasably clamp a portion of a web of at least two containers between the base and the at least two legs,
   wherein the at least one clamp is pivotally mounted to each of the frame member and the at least one clamp actuator, to, in turn, pivot relative to each of the frame member and the at least one actuator from a released orientation to an engaged orientation;
   a handle;
   a first mounting structure, the first mounting structure pivotally mounted to the handle by way of a first linkage; and
   a second mounting structure, the second mounting structure pivotally mounted to the handle by way of a second linkage.

21. The separator assembly of claim 20, wherein:
   the handle includes a first end and a second end, the first end being attached to the at least one clamp, the second end being attached to each of the first and second linkages, and wherein the at least one actuator is mounted to the handle member between the first and second end thereof.

* * * * *